United States Patent
Imamura et al.

(10) Patent No.: US 9,022,152 B2
(45) Date of Patent: May 5, 2015

(54) AUTOMOBILE BODY STRUCTURE

(75) Inventors: Shogo Imamura, Wako (JP); Takafumi Hiragi, Haga-gun (JP); Keita Yoshinaga, Osaka (JP)

(73) Assignee: Honda Motor Co., Ltd., Tokyo (JP)

( * ) Notice: Subject to any disclaimer, the term of this patent is extended or adjusted under 35 U.S.C. 154(b) by 180 days.

(21) Appl. No.: 13/996,790

(22) PCT Filed: Oct. 13, 2011

(86) PCT No.: PCT/JP2011/073522
§ 371 (c)(1),
(2), (4) Date: Oct. 3, 2013

(87) PCT Pub. No.: WO2012/086297
PCT Pub. Date: Jun. 28, 2012

(65) Prior Publication Data
US 2014/0021744 A1    Jan. 23, 2014

(30) Foreign Application Priority Data

Dec. 24, 2010  (JP) .................................. 2010-288570
Dec. 24, 2010  (JP) .................................. 2010-288571

(51) Int. Cl.
*B62D 21/15*    (2006.01)
*B62D 21/09*    (2006.01)
(Continued)

(52) U.S. Cl.
CPC ....... *B62D 21/157* (2013.01); *B60K 2001/0416* (2013.01); *B62D 21/09* (2013.01); *H01M 2/1083* (2013.01); *B60K 2001/0438* (2013.01); *B60K 1/04* (2013.01); *B62D 25/2027* (2013.01)

(58) Field of Classification Search
CPC ...... B62D 21/157; B62D 21/00; B62D 21/10; B62D 21/09; B62D 21/03; B62D 25/20; B62D 25/202; B62D 25/0257; B60K 1/04; B60K 2001/0438; B60K 2001/0416; H01M 2/1083
USPC .......... 180/68.5; 296/187.08, 187.11, 187.12, 296/193.07, 204, 203.03
See application file for complete search history.

(56) References Cited

U.S. PATENT DOCUMENTS 5,549,349 A * 8/1996 Corporon et al. ........ 296/187.12
5,954,390 A * 9/1999 Kleinhoffer et al. ..... 296/203.01
(Continued)

FOREIGN PATENT DOCUMENTS

JP    2000168627 A  *  6/2000  ............. B62D 25/20
JP    2000238541 A  *  9/2000  ............... B60K 1/04
(Continued)

Primary Examiner — J. Allen Shriver, II
Assistant Examiner — Steve Clemmons
(74) Attorney, Agent, or Firm — Rankin, Hill & Clark LLP

(57) ABSTRACT

In an automobile body structure, since a floor panel disposed beneath left and right side sills and a battery support frame includes a center tunnel protruding upwardly and extending in the vehicle body fore-and-aft direction, and a main body portion of the battery support frame and the floor panel are connected via a linking bracket, it is possible to reinforce the battery support frame with the floor panel and prevent the battery support frame from warping into an arc shape and being bent by the collision load of a side collision and, moreover, since even if the battery support frame is formed into a straight line shape, interference with the center tunnel can be avoided, it is possible to reliably make the battery support frame buckle when the collision load of a side collision is inputted thereinto, thus enhancing the ability to absorb the energy of a collision.

13 Claims, 9 Drawing Sheets

(51) Int. Cl.
 H01M 2/10 (2006.01)
 B62D 25/20 (2006.01)
 B60K 1/04 (2006.01)

(56) References Cited

U.S. PATENT DOCUMENTS

| | | | |
|---|---|---|---|
| 6,283,539 B1 * | 9/2001 | Enning et al. | 296/203.03 |
| 6,428,085 B1 * | 8/2002 | Miyasaka et al. | 296/187.12 |
| 6,568,745 B2 * | 5/2003 | Kosuge et al. | 296/193.02 |
| 7,118,167 B2 * | 10/2006 | Nakamura et al. | 296/193.07 |
| 7,445,269 B2 * | 11/2008 | Yustick et al. | 296/187.01 |
| 7,488,017 B2 * | 2/2009 | Lassl et al. | 293/133 |
| 7,500,714 B2 * | 3/2009 | Abe et al. | 296/193.07 |
| 7,527,326 B2 * | 5/2009 | Egawa et al. | 296/193.07 |
| 7,600,807 B2 * | 10/2009 | Bachmann | 296/187.08 |
| 7,614,683 B2 * | 11/2009 | Roccato et al. | 296/187.03 |
| 7,631,926 B2 * | 12/2009 | Fonseka et al. | 296/187.12 |
| 7,644,978 B2 * | 1/2010 | Tosaka et al. | 296/187.12 |
| 8,167,360 B2 * | 5/2012 | Deng et al. | 296/187.08 |
| 2005/0194818 A1 * | 9/2005 | Odaka et al. | 296/187.12 |
| 2007/0096507 A1 * | 5/2007 | Brunner et al. | 296/187.12 |
| 2013/0075173 A1 * | 3/2013 | Kato et al. | 180/68.5 |
| 2013/0229030 A1 * | 9/2013 | Yamaguchi et al. | 296/193.07 |

FOREIGN PATENT DOCUMENTS

| | | | | | |
|---|---|---|---|---|---|
| JP | 2001097149 A | * | 4/2001 | | B60R 16/04 |
| JP | 2003170748 A | * | 6/2003 | | B60K 1/04 |
| JP | 2004345447 A | * | 12/2004 | | B60K 1/04 |
| JP | 2005247003 A | * | 9/2005 | | B62D 25/20 |
| JP | 2006035934 A | * | 2/2006 | | |
| JP | 2010105428 A | * | 5/2010 | | |

* cited by examiner

AUTOMOBILE BODY STRUCTURE

TECHNICAL FIELD

The present invention relates to an automobile body structure in which left and right side sills extending in a vehicle body fore-and-aft direction are connected by a cross member extending in a vehicle width direction.

BACKGROUND ART

An electric automobile body structure that is formed into a rectangular frame shape by providing a connection between front ends of left and right rear frames of an automobile and between intermediate portions in the fore-and-aft direction thereof by means of a front-side middle floor cross member extending in the vehicle width direction and a rear-side rear floor cross member extending in the vehicle width direction and that has a battery mounted in the interior of the frame shape is known from Patent Document 1 below.

RELATED ART DOCUMENTS

Patent Documents

Patent Document 1: Japanese Patent Application Laid-open No. 5-201356

DISCLOSURE OF INVENTION

Problems to be Solved by the Invention

In the above-mentioned conventional arrangement, the middle floor cross member and the rear floor cross member are disposed to the rear of the rear end of a center tunnel of a floor panel, but when it is necessary to dispose a cross member forming a battery support frame above the center tunnel because of a requirement in respect of the position for mounting the battery, it is necessary to curve the battery support frame in order to avoid interference with the center tunnel. However, if the battery support frame is curved, when a collision load of a side collision is inputted into a side sill, the battery support frame is easily bent, and it might therefore become difficult for the energy of the collision to be absorbed effectively by making the battery support frame buckle.

The present invention has been accomplished in light of the above-mentioned circumstances, and it is an object thereof to enable a battery support frame providing a connection between left and right side sills to exhibit a sufficient energy absorbing effect when in a side collision while avoiding interference of the battery support frame with a center tunnel of a floor panel.

Means for Solving the Problems

In order to attain the above object, according to a first aspect of the present invention, there is provided an automobile body structure in which a battery support frame extending in a vehicle width direction provides a connection between left and right side sills extending in a vehicle body fore-and-aft direction, and a battery disposed between the left and right side sills is supported on the battery support frame, characterized in that the battery support frame comprises a high strength steel sheet main body portion, a floor panel disposed beneath the left and right side sills and the battery support frame comprises a center tunnel protruding upwardly and extending in the vehicle body fore-and-aft direction, and the main body portion and the floor panel are connected via a linking bracket.

Further, according to a second aspect of the present invention, in addition to the first aspect, the battery support frame is connected to an upper wall and an inner side wall in the vehicle width direction of the left and right side sills.

Furthermore, according to a third aspect of the present invention, in addition to the first or second aspect, a bolt hole for securing the battery support frame to the left and right side sills by means of a bolt is an elongated hole that is long in the vehicle width direction.

Moreover, according to a fourth aspect of the present invention, in addition to any one of the first to third aspects, a cutout is provided in a lower face of the main body portion, the cutout being for avoiding interference with the center tunnel.

Further, according to a fifth aspect of the present invention, in addition to any one of the first to fourth aspects, the battery support frame comprises left and right weak portions connectedly provided on outer sides, in the vehicle width direction, of the main body portion and connected to the left and right side sills, and the left and right weak portions are formed from a general steel sheet that is weaker than the main body portion.

Furthermore, according to a sixth aspect of the present invention, in addition to the fifth aspect, the main body portion is formed by welding first and second members in a manner such that the two sheets are superimposed so as to give a hollow closed cross-section, the weak portion is formed by welding third and fourth members in a manner such that the two sheets are superimposed so as to give a hollow closed cross-section, and a section where the main body portion and the weak portion are joined is welded such that the positions at an outer end in the vehicle width direction of the first and second members and the positions at an inner end in the vehicle width direction of the third and fourth members are displaced from each other in the vehicle width direction to thus make the number of superimposed sheets no greater than three sheets.

Moreover, according to a seventh aspect of the present invention, in addition to the first aspect, a cross member extending in a straight line in the vehicle width direction provides a connection between the left and right side sills to the rear of or in front of the battery support frame, and the battery is disposed in a space bounded by the left and right side sills, the cross member and the battery support frame.

Further, according to an eighth aspect of the present invention, in addition to the seventh aspect, the battery support frame is provided with a support bracket that is weaker than the battery support frame, and the battery is supported on the support bracket.

Furthermore, according to a ninth aspect of the present invention, in addition to the seventh or eighth aspect, an intermediate portion of the cross member excluding opposite end portions connected to the left and right side sills is reinforced by a stiffener.

Moreover, according to a tenth aspect of the present invention, in addition to any one of the seventh to ninth aspects, the battery support frame is connected to an upper wall and an inner side wall in the vehicle width direction of the left and right side sills.

Further, according to an eleventh aspect, in addition to any one of the seventh to tenth aspects, a bolt hole for securing the battery support frame to the left and right side sills by means of a bolt is an elongated hole that is long in the vehicle width direction.

Furthermore, according to a twelfth aspect, in addition to any one of the seventh to eleventh aspects, of the battery support frame, a weak portion connected to the left and right side sills is formed from a general steel sheet, and the main body portion interposed between the left and right weak portions is formed from a hot stamp formed steel sheet.

Moreover, according to a thirteenth aspect, in addition to any one of the seventh to twelfth aspects, a cutout is provided in a lower face of the main body portion, the cutout being for avoiding interference with the center tunnel.

Further, according to a fourteenth aspect, in addition to the twelfth or thirteenth aspect, the main body portion is formed by welding first and second members, of which one is at the front and the other is at the rear, in a manner such that the two sheets are superimposed so as to give a hollow closed cross-section, the weak portion is formed by welding third and fourth members, of which one is at the front and the other is at the rear, in a manner such that the two sheets are superimposed so as to give a hollow closed cross-section, and a section where the main body portion and the weak portion are joined is welded such that the positions at the outer end in the vehicle width direction of the first and second members and the positions at the inner end in the vehicle width direction of the third and fourth members are displaced from each other in the vehicle width direction to thus make the number of superimposed sheets no greater than three sheets.

Effects of the Invention

In accordance with the first aspect of the present invention, opposite ends of the battery support frame extending in the vehicle width direction are connected to the left and right side sills extending in the vehicle body fore-and-aft direction, and the battery disposed between the left and right side sills is supported on the battery support frame. Since the battery support frame includes the high strength steel sheet main body portion, it is possible to support the collision load of a side collision by means of the battery support frame, thus protecting the battery. Furthermore, since the floor panel disposed beneath the left and right side sills and the battery support frame includes the center tunnel protruding upwardly and extending in the vehicle body fore-and-aft direction, and the main body portion and the floor panel are connected via the linking bracket, it is possible to reinforce the battery support frame by means of the floor panel and prevent the battery support frame from warping into an arc shape and being bent by means of the collision load of a side collision and, moreover, since even if the battery support frame is formed into a straight line shape, interference with the center tunnel can be avoided, it is possible to reliably make the battery support frame buckle when the collision load of a side collision is inputted thereinto, thus enhancing the ability to absorb the energy of a collision.

Furthermore, in accordance with the second aspect of the present invention, since the battery support frame is connected to the upper walls and the inner side walls in the vehicle width direction of the left and right side sills, the strength of a part where the battery support frame and the side sill are connected is increased, and it is thus possible to prevent the battery support frame from bending relative to the left and right side sills when in a side collision and to transmit effectively the collision load to the battery support frame, thus increasing the amount of energy absorbed.

Moreover, in accordance with the third aspect of the present invention, since the bolt hole for securing the battery support frame to the left and right side sills by means of a bolt is an elongated hole that is long in the vehicle width direction, it is possible to absorb any error in the dimensions of the battery support frame by means of the elongated hole.

Furthermore, in accordance with the fourth aspect of the present invention, since the cutout for avoiding interference with the center tunnel of the floor panel is provided in the lower face of the main body portion of the battery support frame, it is possible to easily avoid interference of the battery support frame with the center tunnel while ensuring that it has strength by arranging the battery support frame in a straight line.

Moreover, in accordance with the fifth aspect of the present invention, with regard to the battery support frame, since the weak portions connected to the left and right side sills are formed from a general steel sheet, and the main body portion interposed between the left and right weak portions is formed from a high strength steel sheet, it is possible to make the strength of the weak portions less than that of the main body portion. This allows the weak portions to buckle so as to absorb the collision energy while protecting the main body portion when in a side collision, thus enabling the battery to be protected effectively.

Furthermore, in accordance with the sixth aspect of the present invention, the main body portion of the battery support frame is formed so as to have a hollow closed cross-section by welding the first and second members in a manner such that the two sheets are superimposed, and the weak portion of the battery support frame is formed by welding the third and fourth members in a manner such that the two sheets are superimposed. Since the section where the main body portion and the weak portion are joined is welded such that the positions at the outer end in the vehicle width direction of the first and second members and the positions at the inner end in the vehicle width direction of the third and fourth members are displaced from each other in the vehicle width direction to thus make the number of superimposed sheets no greater than three sheets, it is possible to reliably weld the first to fourth members in the section where they are joined while avoiding difficulty in carrying out welding due to the number of superimposed sheets being four or more.

Moreover, in accordance with the seventh aspect of the present invention, since the cross member extending in a straight line in the vehicle width direction provides a connection between the left and right side sills to the rear of or in front of the battery support frame, and the battery is disposed in a rectangular frame-shaped space bounded by the left and right side sills, the cross member, and the battery support frame, it is possible to absorb the collision load of a side collision by cooperation of the cross member and the battery support frame, thus protecting the battery effectively. Moreover, since no other strength member is disposed between the side sill and the battery, it is possible to maximize the space for disposing the battery, thus increasing the size of the battery that can be installed.

Furthermore, in accordance with the eighth aspect of the present invention, since the battery support frame is provided with the support bracket, which is weaker than the battery support frame, and the battery is supported on the support bracket, even if the collision load of a side collision is imposed on the battery, deformation of the weak support bracket allows the battery to move, thereby avoiding any damage to the battery more effectively.

Moreover, in accordance with the ninth aspect of the present invention, since the intermediate portion of the cross member excluding the opposite end portions connected to the left and right side sills is reinforced by means of a stiffener, it is possible to prevent the intermediate portion from being deformed to thus protect the battery while absorbing the collision load due to a side collision by making the opposite end portions, which are weak with respect to the main body portion, buckle.

Furthermore, in accordance with the tenth aspect of the present invention, since the battery support frame is connected to the upper walls and the inner side walls in the vehicle width direction of the left and right side sills, the strength of a part where the battery support frame and the side sill are connected is increased, and it is thus possible to prevent the battery support frame from bending relative to the left and right side sills when in a side collision and to transmit effectively the collision load to the battery support frame, thus increasing the amount of energy absorbed.

Moreover, in accordance with the eleventh aspect of the present invention, since the bolt hole for securing the battery support frame to the left and right side sills by means of a bolt is an elongated hole that is long in the vehicle width direction, it is possible to absorb any error in the dimension in the lengthwise direction of the battery support frame by means of the elongated hole.

Furthermore, in accordance with the twelfth aspect of the present invention, with regard to the battery support frame, since the weak portions connected to the left and right side sills are formed from a general steel sheet, and the main body portion interposed between the left and right weak portions is formed from a hot stamp formed steel sheet, it is possible to make the strength of the weak portions less than that of the main body portion. This allows the weak portions to buckle so as to absorb the collision energy while protecting the main body portion when in a side collision, thus enabling the battery to be protected effectively.

Moreover, in accordance with the thirteenth aspect of the present invention, since the cutout for avoiding interference with the center tunnel of the floor panel is provided in the lower face of the main body portion of the battery support frame, it is possible to easily avoid interference of the battery support frame with the center tunnel while ensuring that the battery support frame has strength by arranging it in a straight line.

Furthermore, in accordance with the fourteenth aspect of the present invention, the main body portion of the battery support frame is formed so as to have a hollow closed cross-section by welding the first and second members, of which one is at the front and the other is at the rear, in a manner such that the two sheets are superimposed, and the weak portion of the battery support frame is formed by welding the third and fourth members, of which one is at the front and the other is at the rear, in a manner such that the two sheets are superimposed. Since the section where the main body portion and the weak portion are joined is welded such that the positions at the outer end in the vehicle width direction of the first and second members and the positions at the inner end in the vehicle width direction of the third and fourth members are displaced from each other in the vehicle width direction to thus make the number of superimposed sheets no greater than three sheets, it is possible to reliably weld the first to fourth members in the section where they are joined while avoiding difficulty in carrying out welding due to the number of superimposed sheets being four or more.

EXPLANATION OF REFERENCE NUMERALS AND SYMBOLS

Figure 1:
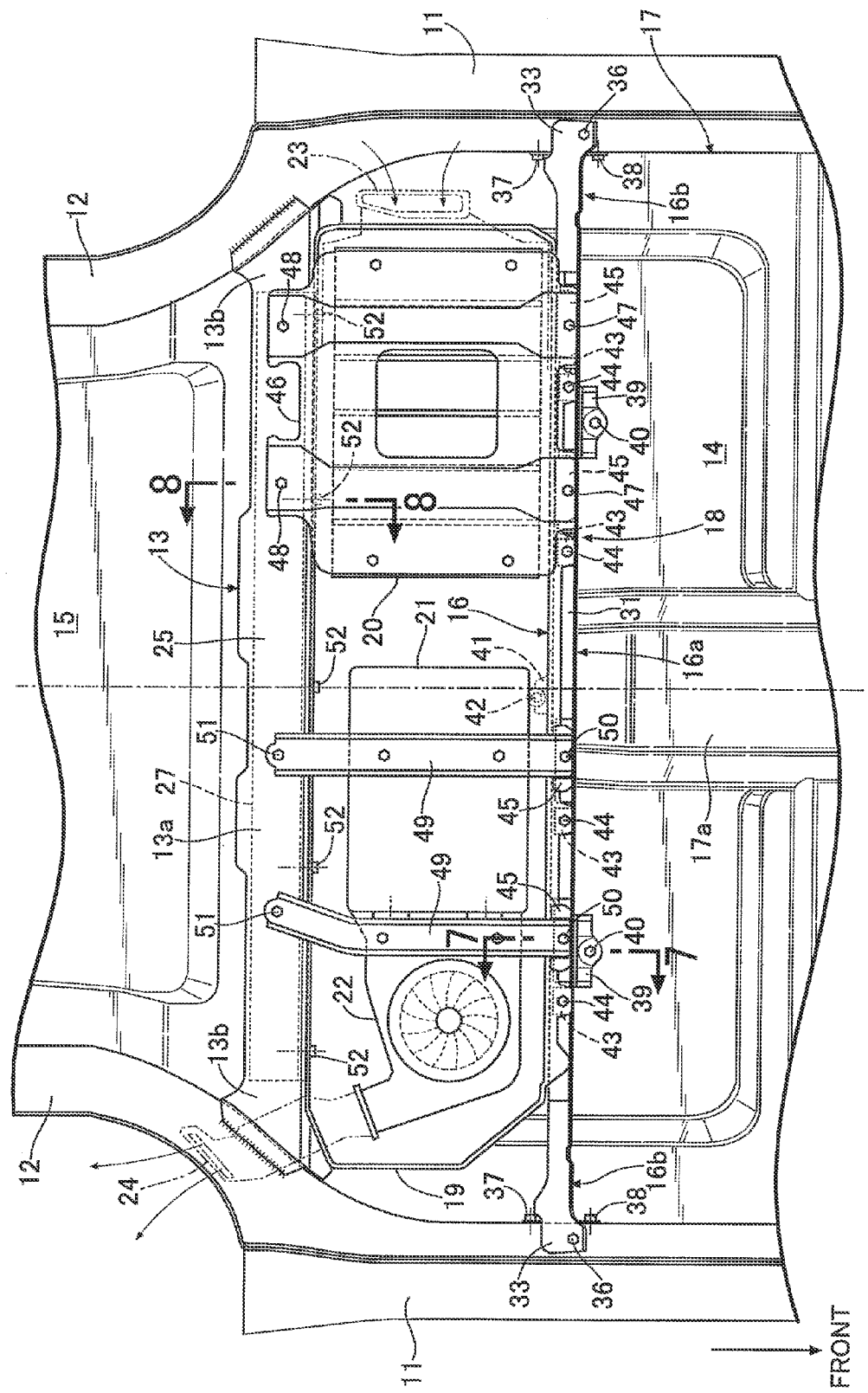
FIG. 1 is a plan view of a rear part of a vehicle body of an automobile. (first embodiment)

11 Side sill
13 Cross member
13a Intermediate portion
13b Opposite end portions
16 Battery support frame
16a Main body portion
16b Weak portion
17 Floor panel
17a Center tunnel
20 Battery
27 Stiffener
31 First member
32 Second member
33 Third member
33e Bolt hole
34 Fourth member
35 Cutout
36 Bolt
39 Linking bracket
41 Linking bracket
45 Support bracket Best Mode for Carrying out the Invention A mode for carrying out the present invention is explained below by reference to FIG. 1 to FIG. 9.

First Embodiment

Figure 2:
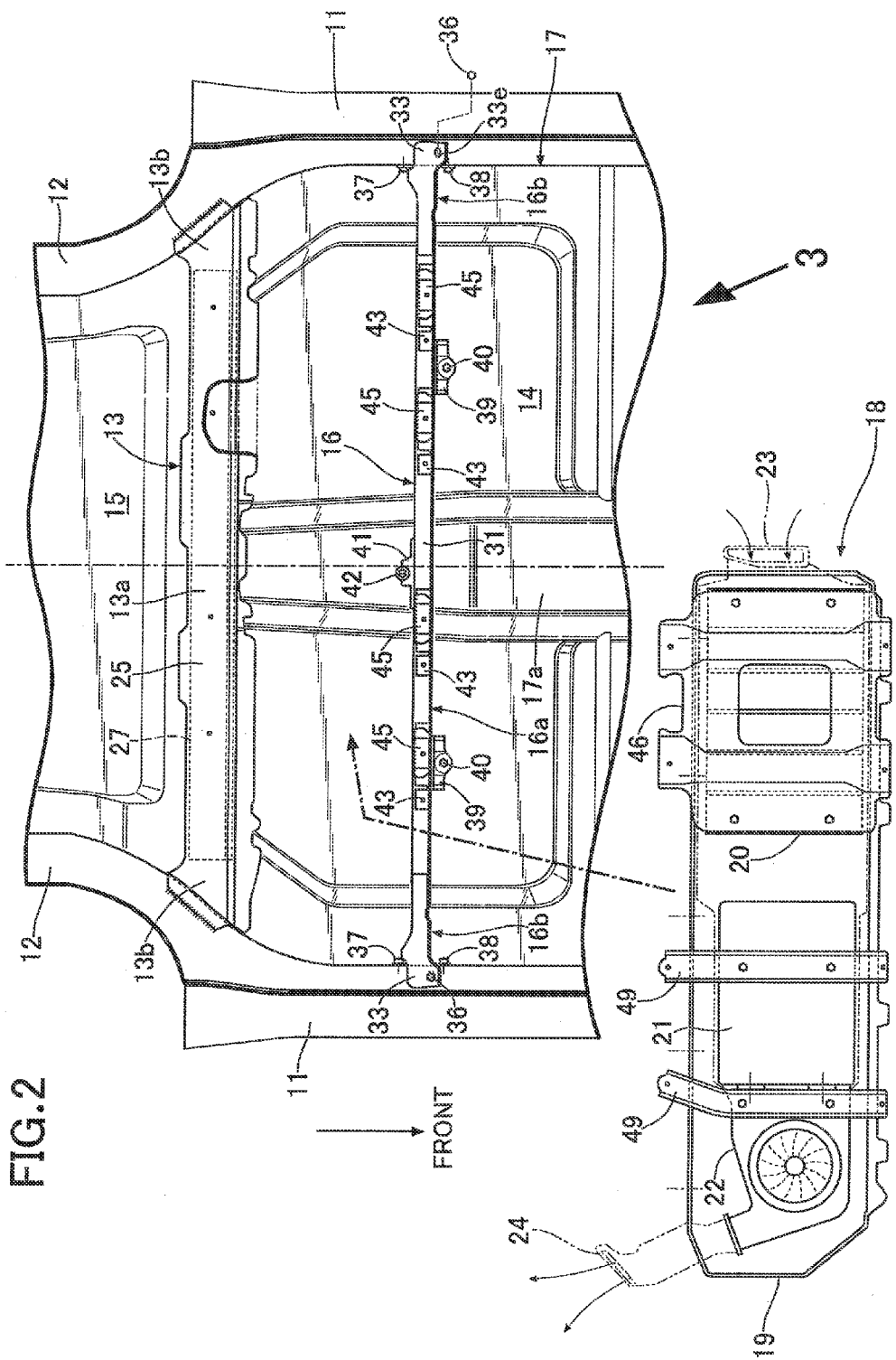
FIG. 2 is a view showing a state in which a battery unit is removed from FIG. 1. (first embodiment)
Figure 3:
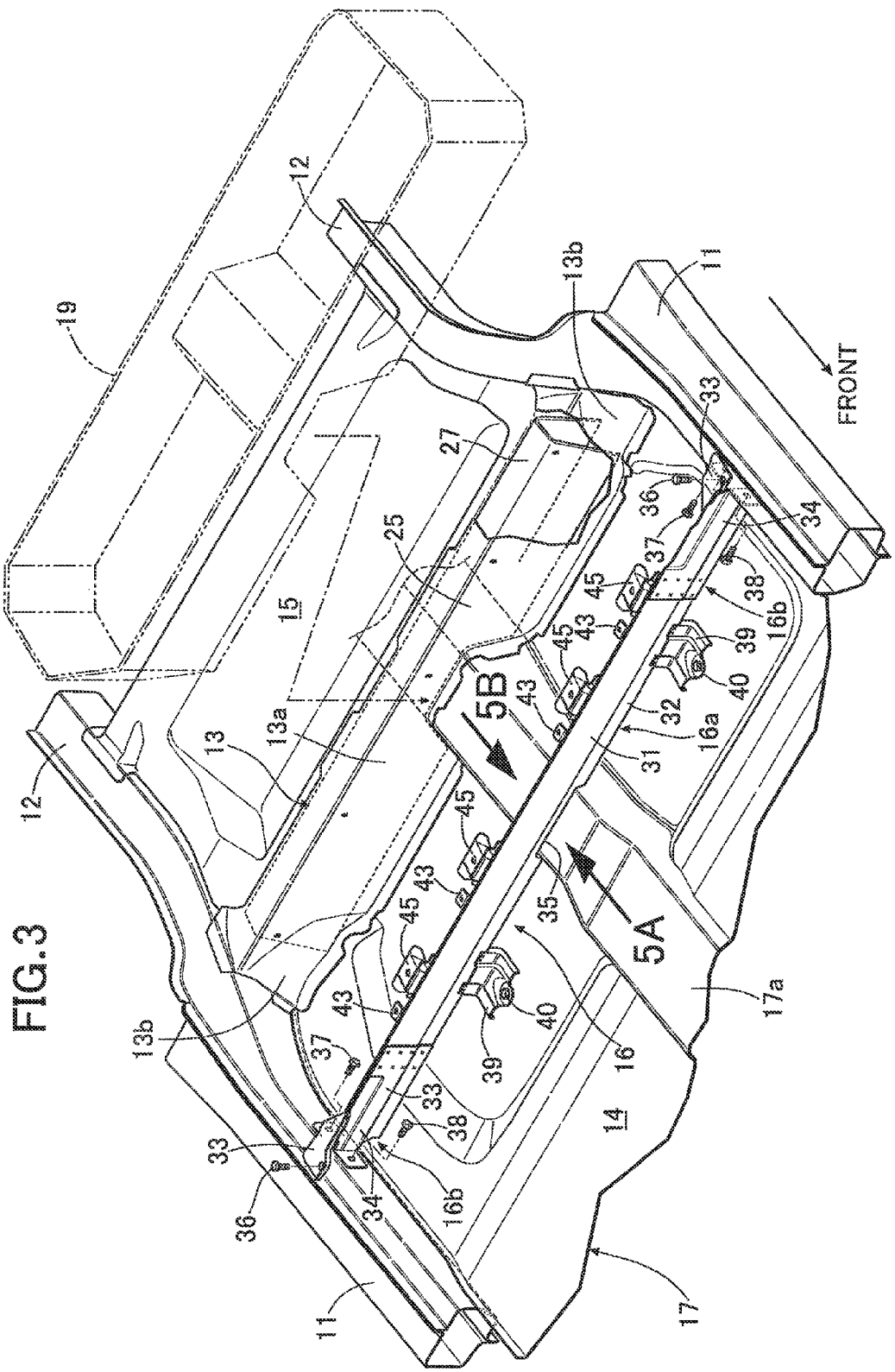
FIG. 3 is a view in the direction of arrow 3 in FIG. 2. (first embodiment)
Figure 4:
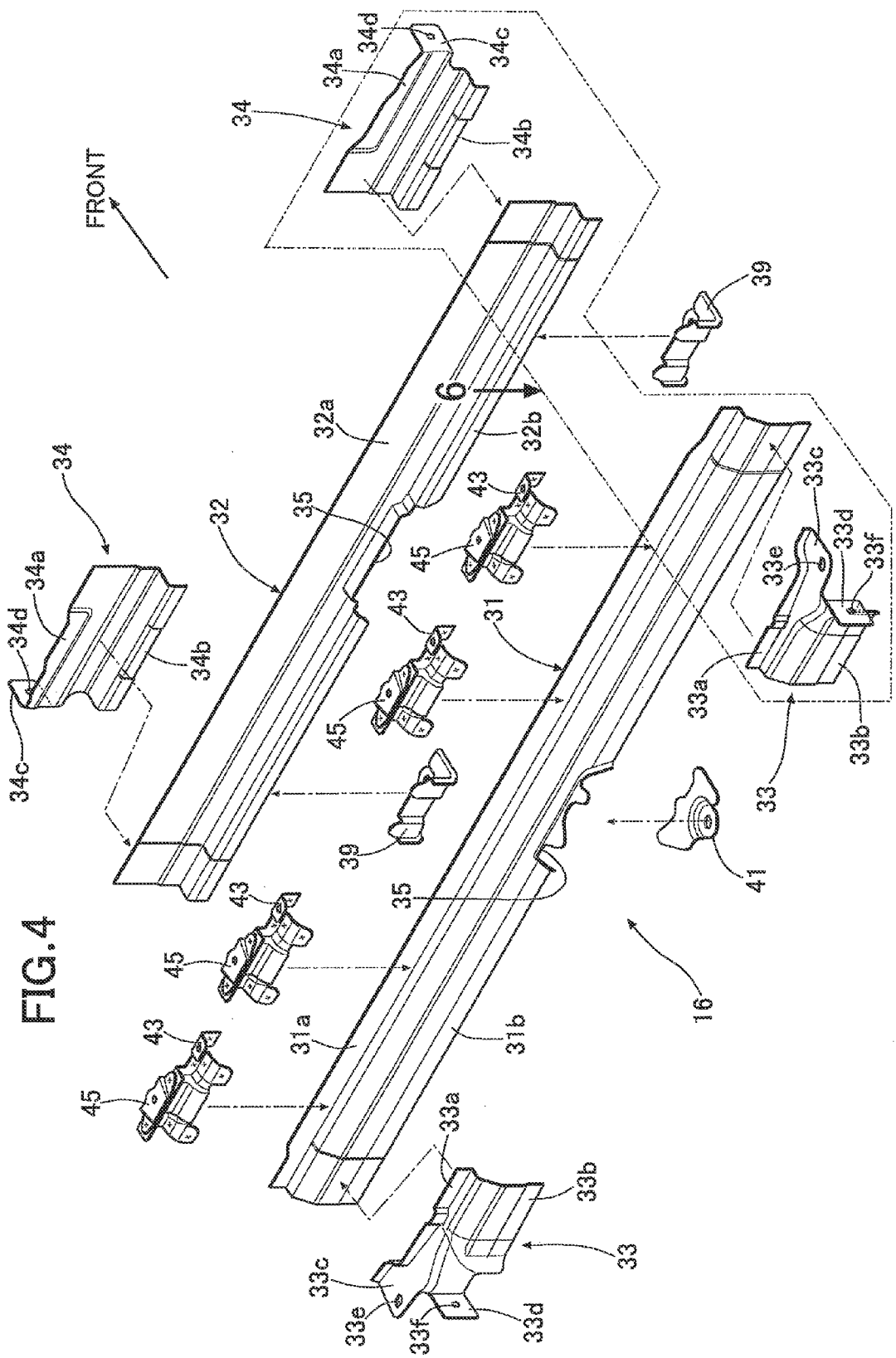
FIG. 4 is a perspective view (exploded view) of a battery support frame. (first embodiment)
Figure 5:
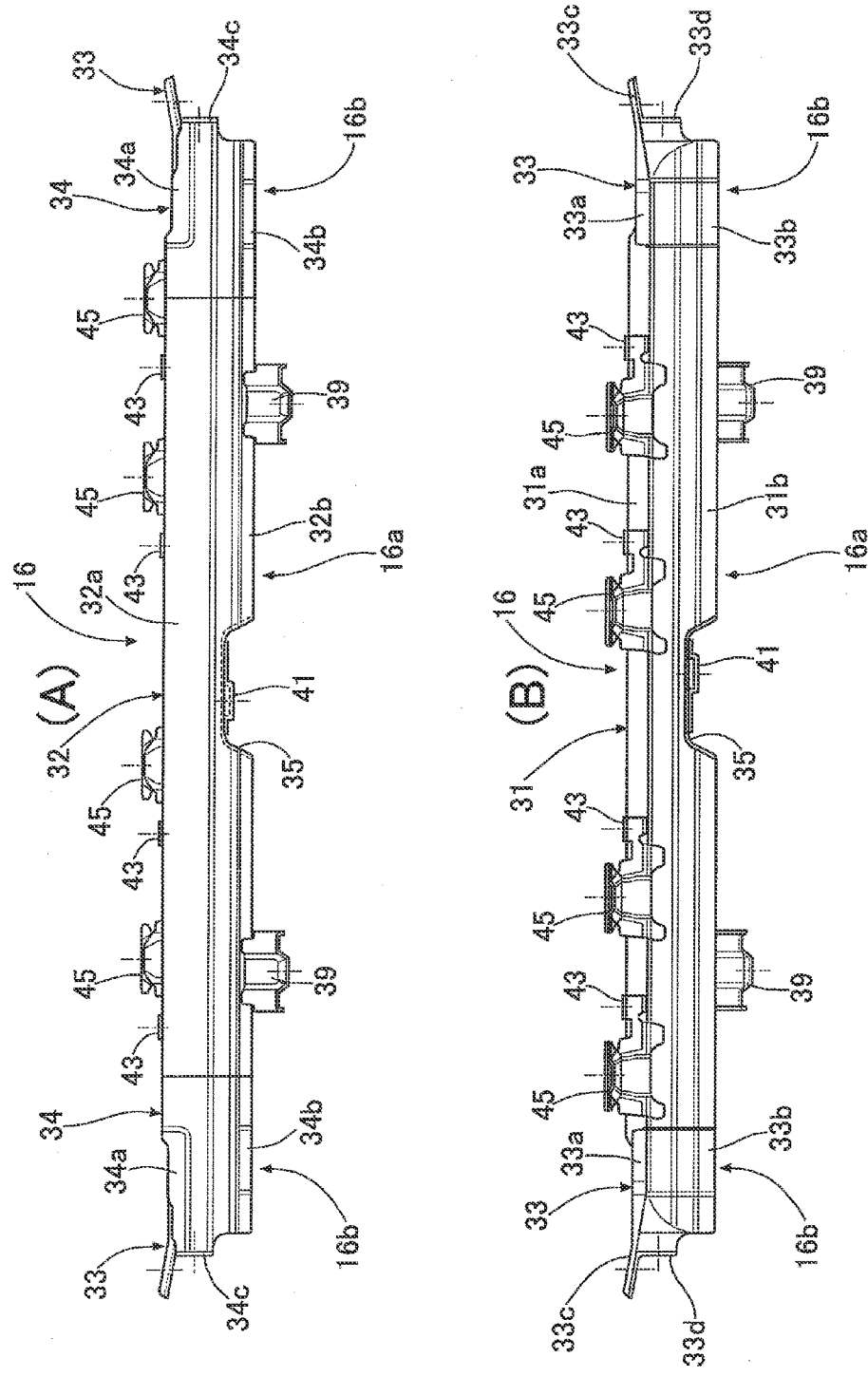
FIG. 5 shows views in the direction of arrows 5A and 5B in FIG. 3. (first embodiment)

FIG. 1 to FIG. 3 show the framework of a rear part (a part where a rear seat is fitted) of a vehicle body of a hybrid automobile equipped with an engine and a motor/generator as drive sources for traveling; left and right rear frames 12 and 12 extend toward the rear of the vehicle body from the rear ends of left and right side sills 11 and 11 extending in a vehicle body fore-and-aft direction. A connection between the rear ends of the left and right side sills 11 and 11 is provided by a cross member 13 extending in a straight line in a vehicle width direction, a passenger compartment 14 is defined in front of the cross member 13, and a luggage compartment 15 is defined to the rear of the cross member 13. In front of the cross member 13, opposite ends of battery support frame 16 extending in a straight line in the vehicle width direction are connected to the left and right side sills 11 and 11. The left and right side sills 11 and 11 are connected via a floor panel 17, and a center tunnel 17a extending in the vehicle body fore-and-aft direction protrudes upward in the middle in the vehicle width direction of the floor panel 17. A battery unit 18 for supplying electricity to the motor/generator is mounted in a space bounded by the left and right side sills 11 and 11, the cross member 13, the battery support frame 16, and the floor panel 17.

The battery unit 18 includes a container-shaped tray 19 having an open upper face, and the tray 19 houses in its interior a battery 20 formed from an assembly of a plurality of battery cells, a control system 21 for controlling driving of the motor/generator by means of the battery 20 and charging of the battery 20 by regenerative braking of the motor/generator, and a cooling fan 22 for cooling the battery 20 and the control system 21. Cooling air taken in by the cooling fan 22 via a cooling air intake opening 23 cools the battery 20 and then cools the control system 21, and the cooling air having an increased temperature passes through the cooling fan 22 and is discharged via a cooling air discharge opening 24.

Figure 8:
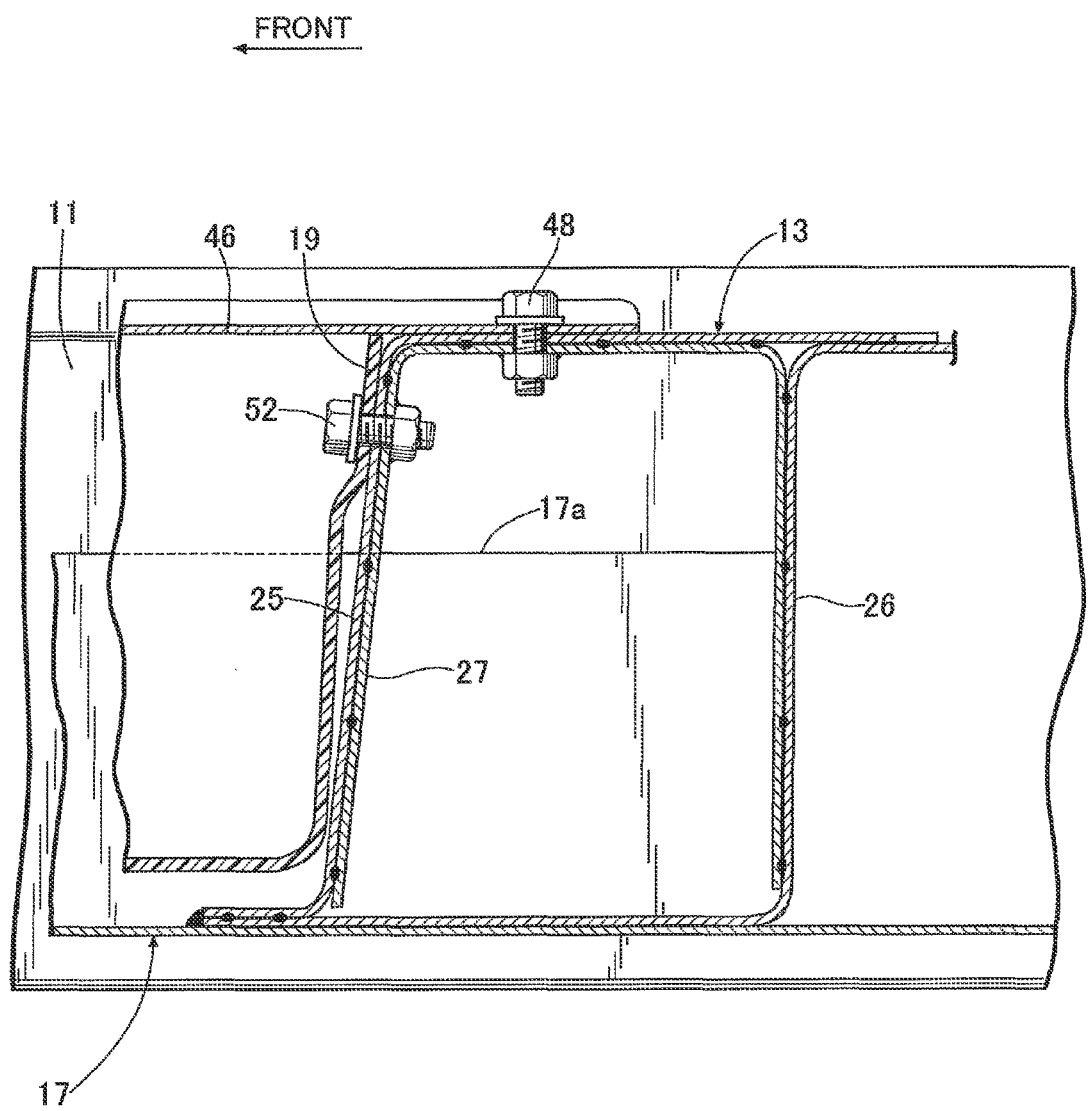
FIG. 8 is a sectional view along line 8-8 in FIG. 1. (first embodiment)

As shown in FIG. 3 and FIG. 8, the cross member 13 is formed by welding first and second members 25 and 26 having an L-shaped cross section into a closed cross-sectional shape, and a stiffener 27 having an inverted U-shaped cross-section is superimposed on an inner face of an intermediate portion 13a in the vehicle width direction thereof for the purpose of reinforcement. Opposite end portions 13b and 13b in the vehicle width direction of the cross member 13, that is, sections that are not reinforced by the stiffener 27, have lower strength than that of the intermediate portion 13a.

The structure of the battery support frame 16 is now explained by reference to FIG. 3 to FIG. 7.

The battery support frame 16 is formed from first and second members 31 and 32 positioned in the middle in the vehicle width direction, third and fourth members 33 and 34 positioned at one end in the vehicle width direction, and third and fourth members 33 and 34 positioned at the other end in the vehicle width direction. The first member 31, which forms a rear face and an upper face of the battery support frame 16, is a high strength member formed by hot stamp forming from a steel sheet, and includes a welding flange 31a extending in the vertical direction at the front edge and a welding flange 31b extending in the vertical direction at the lower edge. The second member 32, which forms a front face and a lower face of the battery support frame 16, is a high strength member formed by hot stamp forming from a steel sheet, and includes a welding flange 32a extending in the vertical direction at the upper edge and a welding flange 32b extending in the vertical direction at the rear edge. Welding the welding flanges 31a and 31b of the first member 31 to the welding flanges 32a and 32b of the second member 32 respectively allows a closed cross-section that is long in the vertical direction to be formed.

The third member 33, which is superimposed on a rear face and an upper face of the first member 31 at opposite end portions of the battery support frame 16, is formed from a general steel sheet having a comparatively low strength and includes welding flanges 33a and 33b that are continuous with the welding flanges 31a and 31b of the first member 31. Furthermore, the fourth member 34, which is superimposed on a front face and a lower face of the second member 32 at opposite end portions of the battery support frame 16, is formed from a general steel sheet having a comparatively low strength and includes welding flanges 34a and 34b that are continuous with the welding flanges 32a and 32b of the second member 32.

An upper mounting flange 33c connected to an upper face of the side sill 11 is formed on an upper face of the third member 33, and a rear mounting flange 33d connected to a side face on the inner side in the vehicle width direction of the side sill 11 is formed on a rear face of the third member 33. Furthermore, a front mounting flange 34c connected to a side face on the inner side in the vehicle width direction of the side sill 11 is formed on a front face of the fourth member 34.

Figure 6:
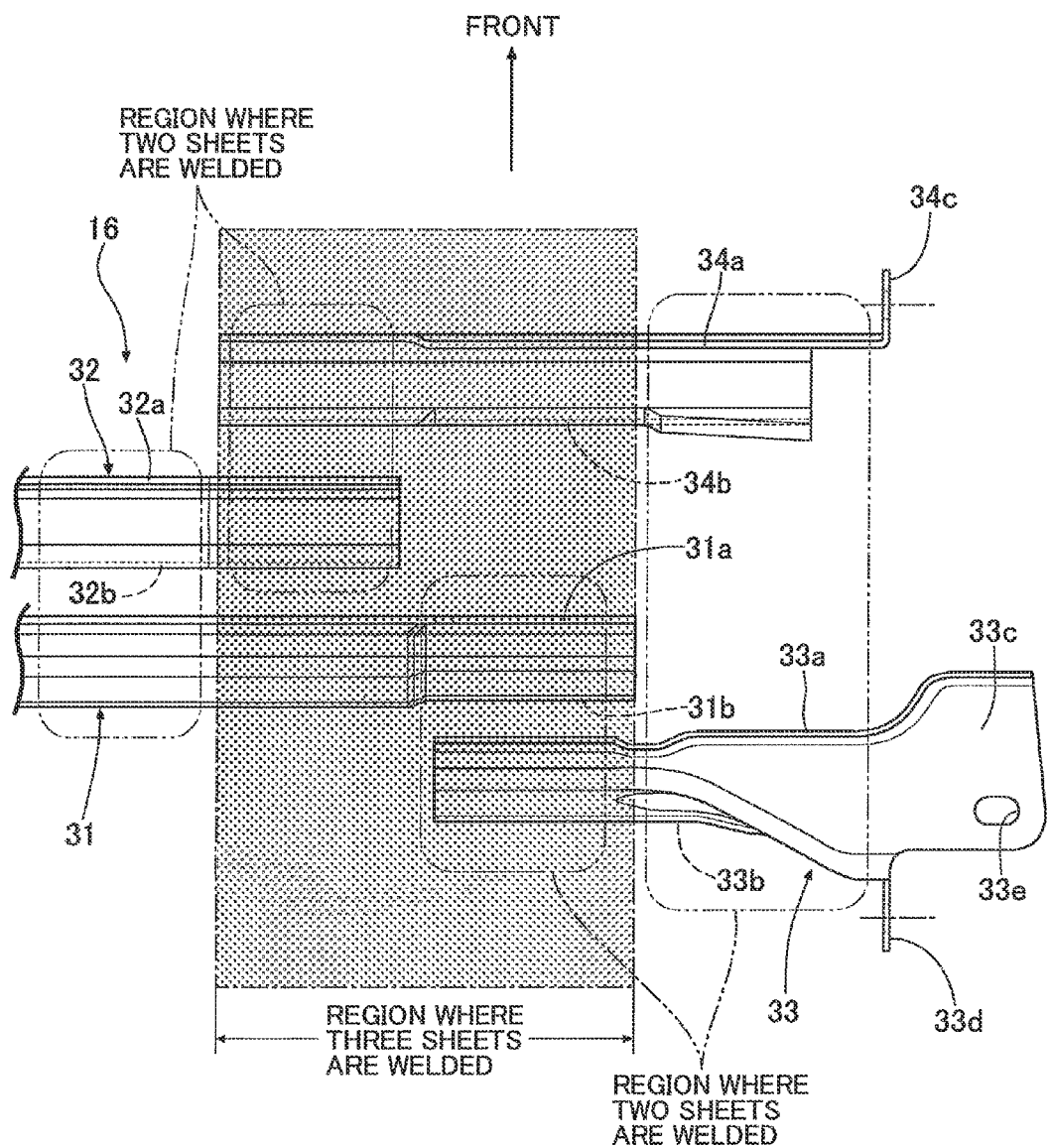
FIG. 6 is a view (exploded view) in the direction of arrow 6 in FIG. 4. (first embodiment)
Figure 7:
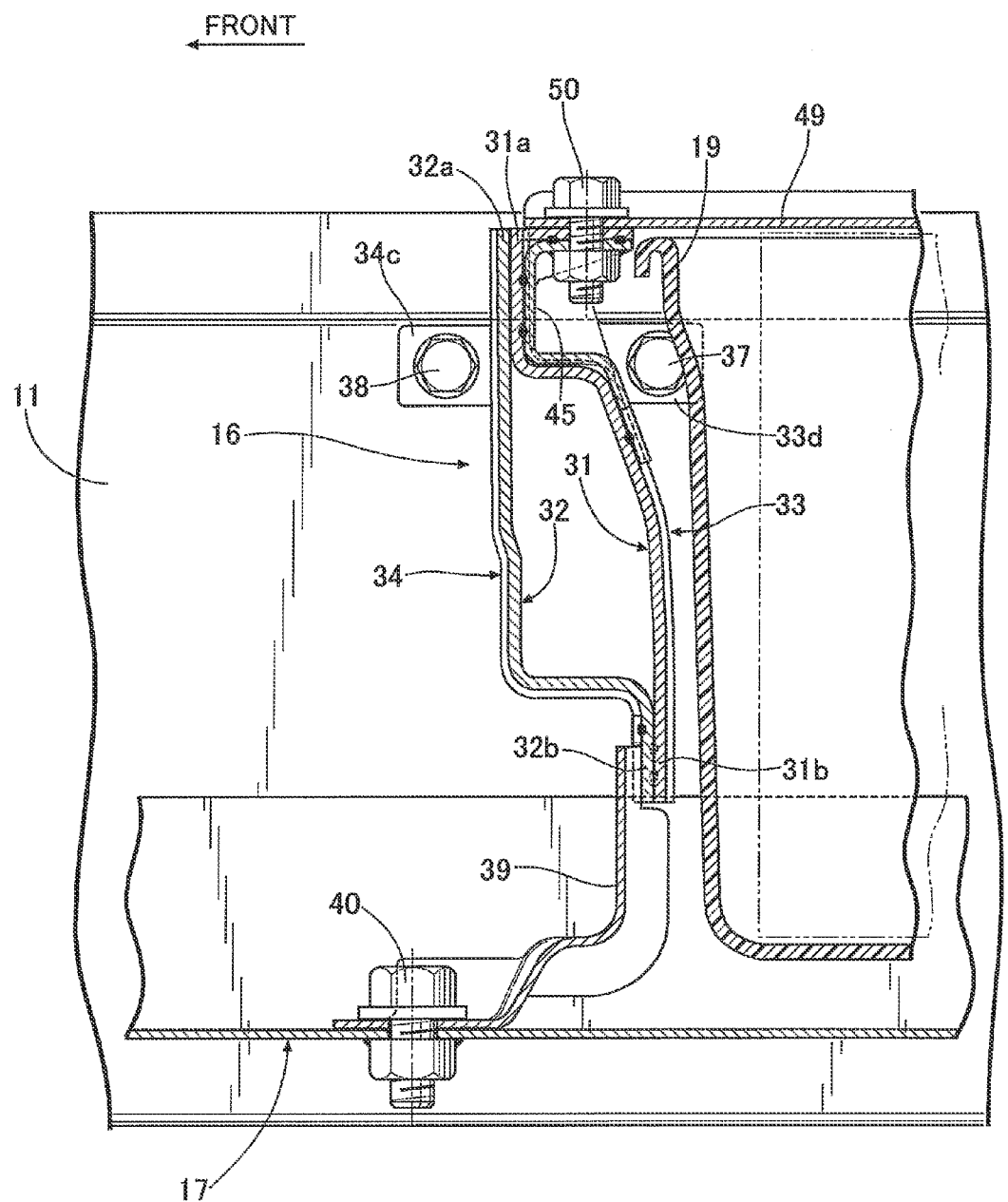
FIG. 7 is a sectional view along line 7-7 in FIG. 1. (first embodiment)

As most clearly shown in FIG. 6, the positions of the outer ends in the vehicle width direction of the first and second members 31 and 32 are displaced from each other and the positions of the inner ends in the vehicle width direction of the third and fourth members 33 and 34 are displaced from each other. Therefore, the second member 32 and the fourth member 34 are welded in a manner such that two sheets are superimposed, the first member 31 and the third member 33 are welded in a manner such that two sheets are superimposed, and the first member 31, the third member 33, and the fourth member 34 are welded in a manner such that three sheets are partially superimposed (in a section in which the first member 31 is sandwiched). The limit to the number of steel sheets welded is three, and displacing the positions of the end parts of the first to fourth members 31 to 34 as described above and welding them enables the first to fourth members 31 to 34 to be reliably welded while avoiding welding in a manner such that four sheets are superimposed.

The first and second members 31 and 32 of the battery support frame 16 form the main body portion 16a, which has comparatively high rigidity, and the third and fourth members 33 and 34 of the battery support frame 16 form the weak portion 16b, which has comparatively low rigidity.

An upwardly recessed cutout 35 is formed in the lower edge of the first and second members 31 and 32. This cutout 35 enables the battery support frame 16 to be formed in a straight line while avoiding interference of the battery support frame 16 with the center tunnel 17a of the floor panel 17.

Bolt holes 33e and 33f are formed in the upper mounting flange 33c and the rear mounting flange 33d respectively of the third member 33, and a bolt hole 34d is formed in the front mounting flange 34c of the fourth member 34. Only the bolt hole 33e of the upper mounting flange 33c of the third member 33 is an elongated hole that is long in the vehicle width direction (see FIG. 6). Securing a bolt 36 extending through the bolt hole 33e of the upper mounting flange 33c of the third member 33 to the upper face of the side sill 11 and securing a bolt 37 extending through the bolt hole 33f of the rear mounting flange 33d of the third member 33 and a bolt 38 extending through the bolt hole 34d of the front mounting flange 34c of the fourth member 34 to the inner side face in the vehicle width direction of the side sill 11 enables the opposite end portions of the battery support frame 16 to be joined to the left and right side sills 11 and 11. In this arrangement, since the bolt hole 33e of the upper mounting flange 33c of the third member 33 is formed as an elongated hole that is long in the vehicle width direction, it is possible to absorb any error in the dimension in the lengthwise direction of the battery support frame 16, thereby making it easy to assemble it to the side sills 11 and 11.

A pair of left and right linking brackets 39 and 39 forming an L shape are provided at positions spaced in the left-and-right direction on the rear face of the second member 32, and these linking brackets 39 and 39 are secured to an upper face of the floor panel 17 by means of bolts 40 and 40. Furthermore, one linking bracket 41 is provided on the cutout 35 in the lower face of the battery support frame 16, and this linking bracket 41 is secured to an upper face of the center tunnel 17a of the floor panel 17 by means of a bolt 42.

In this way, since the battery support frame 16 is supported so as to float above the floor panel 17 via the linking brackets 39, 39, and 41, even if the center tunnel 17a protrudes from the floor panel 17, in combination with the effect of the cutout 35, the battery support frame 16 can be formed in a straight line without interfering with the center tunnel 17a.

Four small brackets 43 are provided on the rear face of the battery support frame 16, and the front edge of the tray 19 is fixed to these small brackets 43 via four bolts 44 (see FIG. 1). A rear part of the tray 19 is fixed to a front face of the cross member 13 via five bolts 52 (see FIG. 1 and FIG. 8).

Four support brackets 45 formed integrally with the four small brackets 43 are fixed to the rear face of the battery support frame 16. The strength of the support brackets 45 is set to be lower than the strength of the first and second members 31 and 32 of the battery support frame 16, which is formed by hot stamp forming. The battery 20 is fixed to a lower face of a plate-shaped suspending member 46, a front part of the suspending member 46 is secured to the two support brackets 45 and 45 on the vehicle body left side by means of two bolts 47 and 47, and a rear part of the suspending member 46 is secured to an upper face of the cross member 13 by means of two bolts 48 and 48.

Furthermore, the control system 21 and the cooling fan 22 are united and fixed to lower faces of two plate-shaped suspending members 49 and 49. Front parts of the two suspending members 49 and 49 are secured to the two support brackets 45 and 45 on the vehicle body right side by means of two bolts 50 and 50, and rear parts of the two suspending members 49 and 49 are secured to the upper face of the cross member 13 by means of two bolts 51 and 51.

The operation of the embodiment of the present invention having the above-mentioned arrangement is now explained.

Since the battery unit 18 is disposed in a space formed into a rectangular shape from the left and right side sills 11 and 11 extending in the vehicle body fore-and-aft direction, the cross member 13 extending in a straight line in the vehicle width direction on the side toward the rear of the vehicle body, and the battery support frame 16 extending in a straight line in the vehicle width direction on the side toward the front of the vehicle body, it is possible to absorb the collision load of a side collision by cooperation of the cross member 13 and the battery support frame 16, thus protecting the battery unit 18 effectively and, moreover, since no other strength member is disposed between the side sills 11 and 11 and the battery unit 18, it is possible to maximize the space for disposing the battery unit 18, thus increasing the size of the battery 20 that can be installed.

Furthermore, since the battery support frame 16 is connected to the upper face of the floor panel 17 via the linking brackets 39, 39, and 41, not only can the battery support frame 16 be reinforced by the floor panel 17, but it is also possible to form the battery support frame 16 in a straight line even when the floor panel 17 is not flat due to the center tunnel 17a. The battery support frame 16 can be prevented from being bent by the collision load of a side collision, and the battery support frame 16 is reliably made to buckle together with the cross member 13, which is also formed in a straight line, thus enhancing the performance in absorbing energy when in a side collision.

Furthermore, since the battery 20 is not supported directly on the battery support frame 16 but is supported via the weak support brackets 45 and 45 provided on the battery support frame 16, even if the collision load of a side collision is imposed on the battery 20, deformation or breakage of the weak support brackets 45 and 45 allows the battery 20 to move, thereby avoiding any damage to the battery 20 more effectively.

Figure 9:
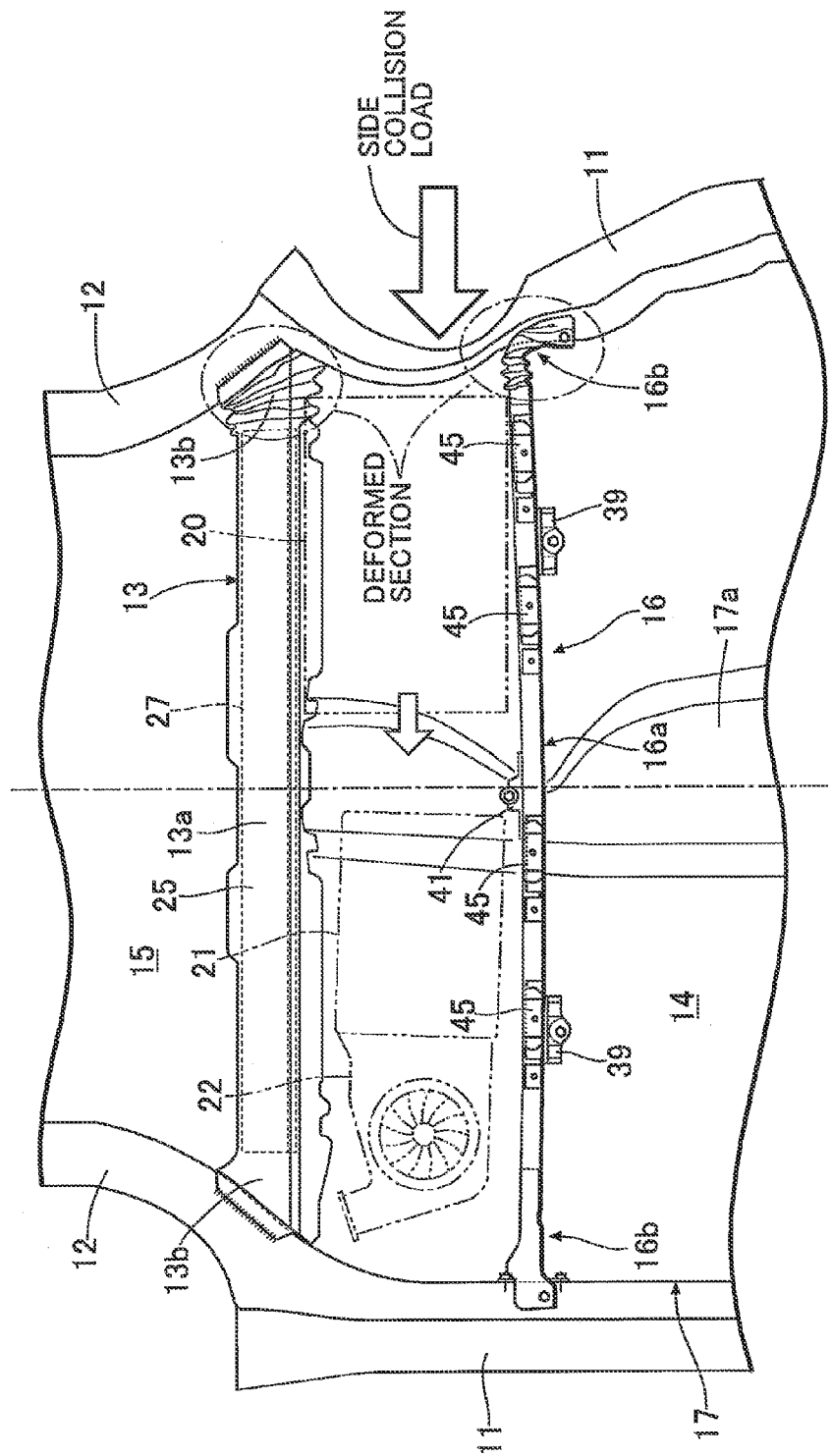
FIG. 9 is a diagram for explaining the operation when an automobile is involved in a side collision. (first embodiment)

Furthermore, when as shown in FIG. 9 the vehicle is involved in a side collision, the collision load in the vehicle width direction is inputted into the cross member 13 and the battery support frame 16. In this arrangement, since the intermediate portion 13a of the cross member 13 excluding the opposite end portions 13b and 13b connected to the left and right side sills 11 and 11 is reinforced by means of the stiffener 27, it is possible to prevent the intermediate portion 13a from being deformed to thus protect the battery 20 while absorbing the collision load due to the side collision by making the weak opposite end portions 13b and 13b buckle.

Similarly, with regard to the battery support frame 16, since the weak portions 16b and 16b connected to the left and right side sills 11 and 11 are formed from a general steel sheet, and the main body portion 16a interposed between the left and right weak portions 16b and 16b is formed from a hot stamp formed steel sheet, it is possible to make the strength of the weak portions 16b and 16b less than that of the main body portion 16a. This allows the weak portions 16 b and 16b to buckle so as to absorb the collision energy while protecting the main body portion 16a when in a side collision, and prevents deformation of the battery support frame 16 from affecting the battery 20, thus enabling the battery 20 to be protected effectively.

Since in this arrangement the battery support frame 16 is connected to the upper walls and the inner side walls in the vehicle width direction of the left and right side sills 11 and 11, increasing the strength of a part where the battery support frame 16 and the side sills 11 and 11 are connected enables bending of the battery support frame 16 relative to the left and right side sills 11 and 11 to be prevented when in a side collision and the collision energy to be transmitted effectively to the battery support frame 16, thus increasing the amount of energy absorbed.

An embodiment of the present invention is explained above, but the present invention may be modified in a variety of ways as long as the modifications do not depart from the spirit and scope thereof.

For example, in the embodiment the first member 31 forms the rear face and the upper face of the battery support frame 16, and the second member 32 forms the front face and the lower face of the battery support frame 16, but a battery support frame 16 may be formed by freely combining members with any shape.

Furthermore, in the embodiment the battery support frame 16 is disposed further toward the front of the vehicle body than the cross member 13, but it may be disposed toward the rear of the vehicle body.

Moreover, in the embodiment the first member 31 and the second member 32 are high strength members formed by hot stamp forming, but are not limited to those formed by hot stamp forming.

The invention claimed is:

1. An automobile body structure in which a battery support frame extending in a vehicle width direction provides a connection between left and right side sills extending in a vehicle body fore-and-aft direction, and a battery disposed between the left and right side sills is supported on the battery support frame, wherein the battery support frame comprises a high strength steel sheet main body portion, a floor panel disposed beneath the left and right side sills and the battery support frame comprises a center tunnel protruding upwardly and extending in the vehicle body fore-and-aft direction, and the main body portion and the floor panel are connected via a linking bracket, the battery support frame comprises left and right weak portions connectedly provided on outer sides, in the vehicle width direction, of the main body portion and connected to the left and right side sills, and the left and right weak portions are formed from a general steel sheet that is weaker than the main body portion, and the main body portion is formed by welding first and second members such that the two sheets are superimposed so as to give a hollow closed cross-section, the weak portion is formed by welding third and fourth members such that the two sheets are superimposed so as to give a hollow closed cross-section, and a section where the main body portion and the weak portion are joined is welded such that the positions at an outer end in the vehicle width direction of the first and second members and the positions at an inner end in the vehicle width direction of the third and fourth members are displaced from each other in the vehicle width direction to thus make the number of superimposed sheets no greater than three sheets.

2. The automobile body structure according to claim 1, wherein the battery support frame is connected to an upper wall and an inner side wall in the vehicle width direction of the left and right side sills.

3. The automobile body structure according to claim 1, wherein a bolt hole for securing the battery support frame to the left and right side sills via a bolt is an elongated hole that is long in the vehicle width direction.

4. The automobile body structure according to claim 1, wherein a cutout is provided in a lower face of the main body portion, the cutout being for avoiding interference with the center tunnel.

5. The automobile body structure according to claim 1, wherein a cross member extending in a straight line in the vehicle width direction provides a connection between the left and right side sills to the rear of or in front of the battery support frame, and the battery is disposed in a space bounded by the left and right side sills, the cross member and the battery support frame.

6. The automobile body structure according to claim 5, wherein the battery support frame is provided with a support bracket that is weaker than the battery support frame, and the battery is supported on the support bracket.

7. The automobile body structure according to claim 5, wherein an intermediate portion of the cross member excluding opposite end portions connected to the left and right side sills is reinforced by a stiffener.

8. The automobile body structure according to claim 5, wherein the battery support frame is connected to an upper wall and an inner side wall in the vehicle width direction of the left and right side sills.

9. The automobile body structure according to claim 5, wherein a bolt hole for securing the battery support frame to the left and right side sills via a bolt is an elongated hole that is long in the vehicle width direction.

10. The automobile body structure according to claim 5, wherein the main body portion is formed from a hot stamp formed steel sheet.

11. The automobile body structure according to claim 10, wherein the first and second members are divided so that one of the first and second members is at the front and the other is at the rear, and the third and fourth members are divided so that one of the third and fourth members at the front and the other is at the rear.

12. The automobile body structure according to claim 5, wherein a cutout is provided in a lower face of the main body portion, the cutout being for avoiding interference with the center tunnel.

13. The automobile body structure according to claim 12, wherein the first and second members are divided so that one of the first and second members is at the front and the other is at the rear, and the third and fourth members are divided so that one of the third and fourth members at the front and the other is at the rear.

* * * * *